UNITED STATES PATENT OFFICE.

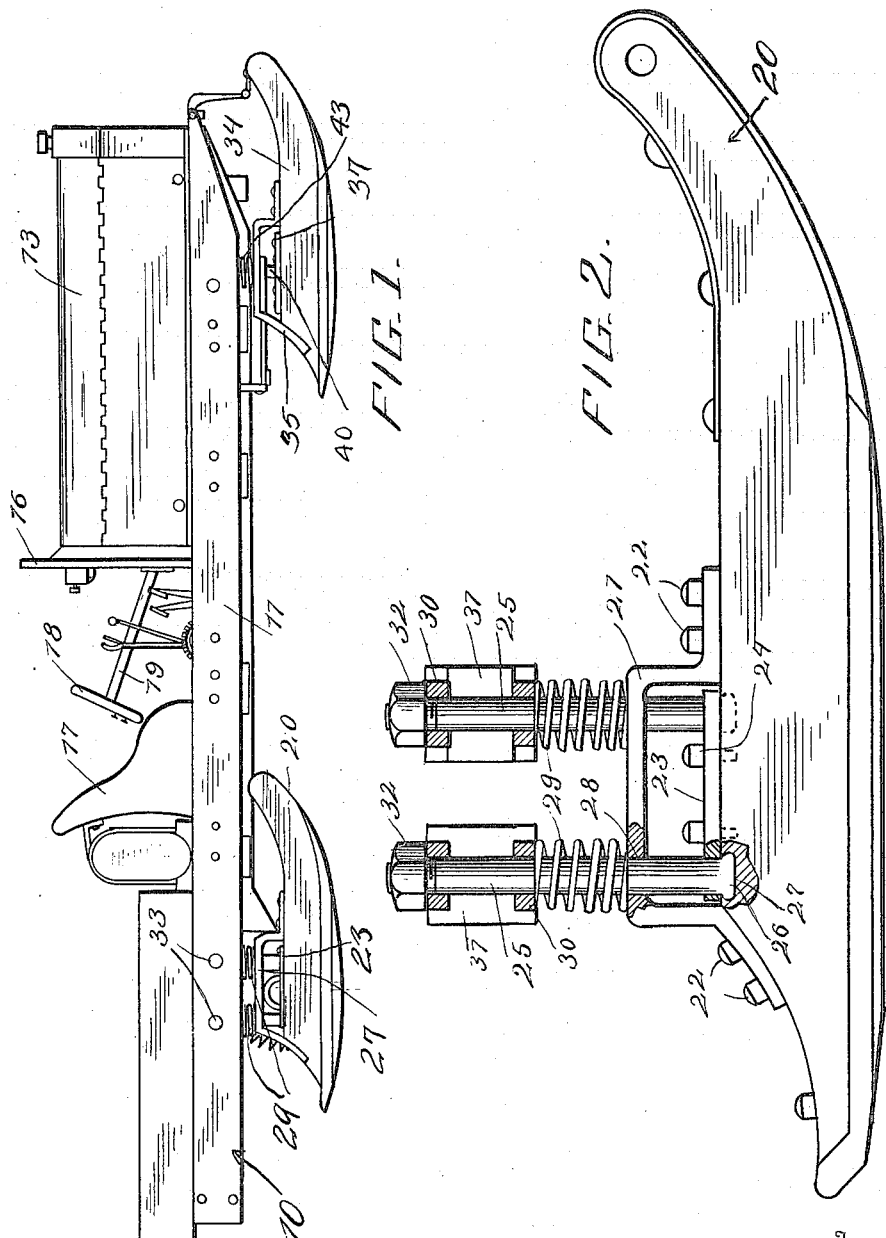

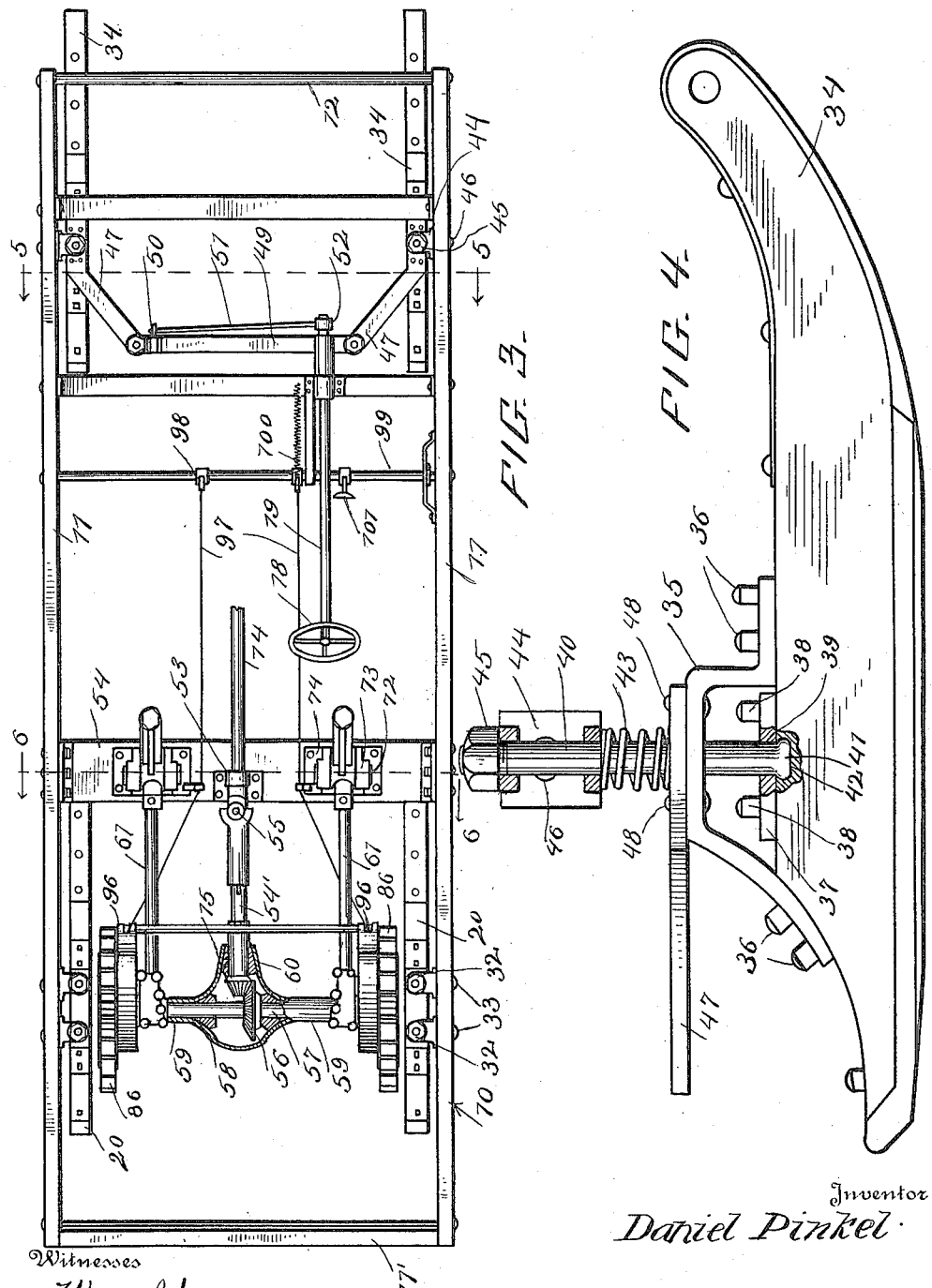

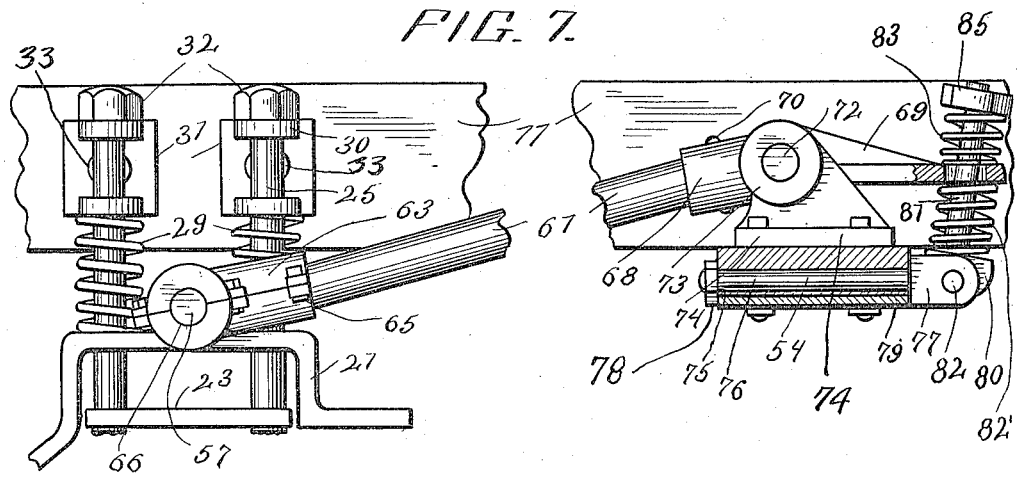

DANIEL PINKEL, OF RICHMOND, MICHIGAN, ASSIGNOR TO DAVID CARL, OF RICHMOND, MICHIGAN.

POWER-DRIVEN SLED.

1,158,407.  Specification of Letters Patent.  Patented Oct. 26, 1915.

Application filed November 27, 1914. Serial No. 874,328.

*To all whom it may concern:*

Be it known that I, DANIEL PINKEL, a citizen of the United States, residing at Richmond, in the county of Macomb and State of Michigan, have invented certain new and useful Improvements in Power-Driven Sleds, of which the following is a specification.

My invention relates to improvements in power driven sleds.

Important objects of the invention are to provide novel and efficient spring means for securing the frame or chassis, with the runners, for forming a strong connection which is highly shock absorbing; to provide vertically movable self-compensating means for connecting the spur wheels or gears with the frame or chassis, whereby the same is adapted to travel over irregularities in the road bed; to provide a sled of the above mentioned character which may be as conveniently steered and operated as an ordinary automobile; to provide a sled of the above mentioned character formed of parts which are readily separable for the purpose of repair or cleaning; to provide a sled of the above mentioned character which is comparatively simple in construction, inexpensive to manufacture, strong and durable.

Other objects and advantages of the invention will be apparent during the course of the following description.

Figure 5:
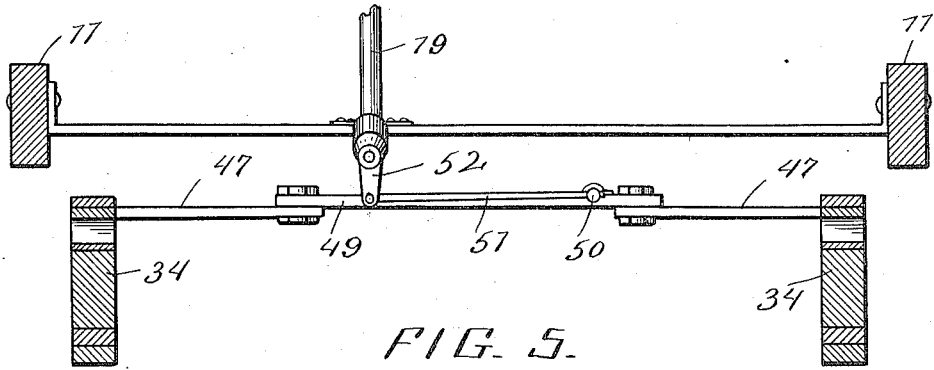
Figure 10:
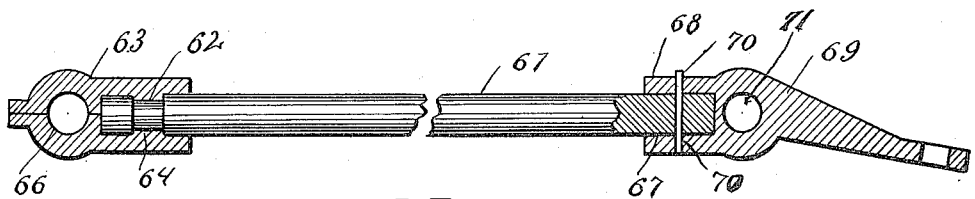

In the acompanying drawings forming a part of this specification and in which like numerals are employed to designate like parts throughout the same, Figure 1 is a side elevation of a power driven sled embodying my invention. Fig. 2 is an enlarged side elevation of one of the rear runners, showing the attaching means therefor, Fig. 3 is a plan view of the sled with parts removed for the sake of illustration, Fig. 4 is a side elevation of one of the forward runners removed, Fig. 5 is a transverse sectional view taken on line 5—5 of Fig. 3, Fig. 6 is a similar view taken on line 6—6 of Fig. 3, Fig. 7 is an enlarged fragmentary side elevation of the vertical swinging means for securing the driving spur gears to the frame of the sled, Fig. 8 is a side elevation of one spur gear removed, Fig. 9 is a sectional view taken on line 9—9 of Fig. 8, and Fig. 10 is a side elevation, parts being shown in section, of one vertically swinging connecting arm.

Figure 3:
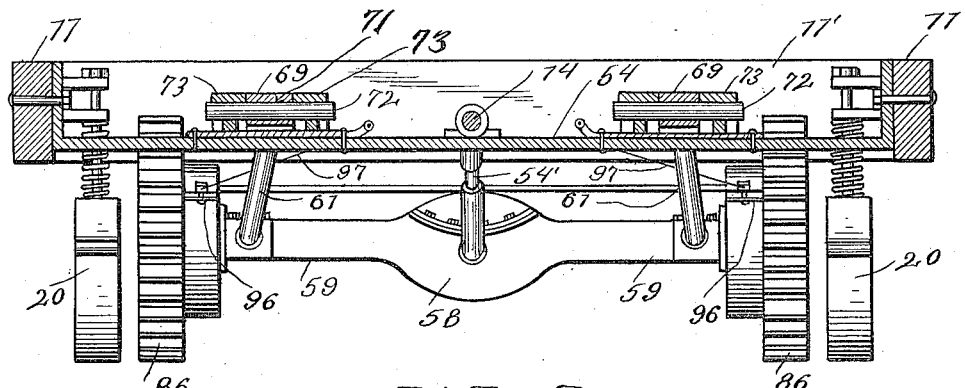

In the drawings, wherein for the purpose of illustration is shown a preferred embodiment of my invention, the numeral 10 designates a frame or chassis, embodying longitudinal side beams 11, connected at their ends by transverse bars or rods 11' and 12, as more clearly shown in Fig. 3. Arranged upon the forward portion of the frame 10 is a hood 13, within which is an explosion engine of any well known or preferred type, (not shown). This explosion engine, through the medium of a friction clutch (not shown) transmits rotation to a shaft 14, which drives a bevel gear 15, for a purpose to be described. Disposed at the rear end of the hood 13 is a dash-board 16. The numeral 17 designates a seat or seats, arranged rearwardly of the dash-board 16. The numeral 18 designates a steering wheel, secured to a steering rod 19, to be described. The engine is operated in a well known manner and no further description thereof will be given.

The numeral 20 designates the rear runners, preferably of the shape shown. Secured to the upper sides of each rear runner 20 near and spaced from the rear end thereof, is an inverted approximately U-shaped bracket 21, attached thereto by means of screws or bolts 22, as shown.

Arranged within each of the brackets 21 is a securing plate 23, attached to the runner by screws or bolts 24. The opposite ends of the securing plate 23 are apertured, for receiving vertical connecting bolts 25, provided at their lower ends with heads 26, disposed below the securing plate and arranged within recesses 27 formed upon the upper sides of the runner 20. These connecting bolts pass through openings 28 formed in the end portions of the brackets 21.

Surrounding the intermediate portions of the connecting bolts 25 are suitably stiff compressible coil springs 29, engaging the bracket 21 and apertured ears or knuckles 30 carried by a frame bracket 31. The apertured ears or knuckles 30 are longitudinally movably mounted upon the connecting bolts 25, so that they can reciprocate therein, the upper ends of the connecting bolts being screw-threaded for receiving nuts 32, as shown. The frame brackets 31 are arranged upon the inner side of the longitudinal side beam 11, near the rear end thereof, and are secured thereto by bolts 33. From the foregoing description, it is obvious that the rear runners are arranged below the frame or chassis 10 and are yieldingly connected therewith taking up vertical shocks which would otherwise be transmitted from the road to the frame.

The numeral 34 designates front runners, preferably of the shape shown. As more clearly shown in Fig. 4, each front runner has an inverted approximately U-shaped bracket 35, arranged upon the upper side thereof, near and spaced from the rear end thereof, such bracket being secured thereto by means of screws or bolts 36, as shown.

Arranged within each bracket 35 is a securing plate 37, attached to the runner by screws or bolts 38. Each securing plate 37 is provided centrally thereof with an opening 39, to receive a vertical pivotal connecting bolt 40. This bolt is provided at its lower end with a head 41, arranged below and adjacent the securing plate 37 and fitting within a recess 42 formed upon the upper surface of the runner. Surrounding the intermediate portion of each pivotal connecting bolt 40 is a suitably stiff compressible coil spring 43, engaging an apertured frame bracket 44, pivotally mounted upon the bolt 40. The upper end of the bolt 40 is screw-threaded for receiving a nut 45. The bracket 44 is secured to the longitudinal side beam 11 by a bolt 46 or the like.

Rigidly connected with the upper end of each bracket 35 is a steering crank or fork 47, secured thereto by bolts 48 or the like. The crank 47 and bracket 35 are apertured for receiving the bolt 40. The rear ends of the steering cranks or forks 47 are pivotally connected with a drag-link 49. Pivotally connected with this drag-link, as shown at 50, is a steering link 51, having pivotal connection with a depending crank 52, as best shown in Fig. 5. The depending crank is rigidly secured to the forward end of the steering shaft 19, to be turned therewith. It is obvious that by proper manipulation of the steering wheel 18 that the slide may be steered in the desired direction.

The drive shaft 14 has its rear end journaled through a stationary bearing 53, rigidly secured to a transverse strip or bar 54, in turn bolted or otherwise rigidly attached to the longitudinal side beams 11, as shown. The drive shaft 14 is connected with the bevel gear 15, as above stated, by a self-compensating longitudinally extensible and contractible coupling 54' one member of which has a universal connection with the rear end of the drive shaft 14, as shown at 55. The bevel gear 15 engages a bevel gear 56, rigidly secured upon a transverse driving shaft 57, as shown. The bevel gear 56 is arranged within a gear housing 58, including tubular end portions 59 and 60, which receive respectively the transverse driving shaft 57 and a portion of the coupling 54', as shown.

The numeral 61 designates vertically swinging securing arms, each of which, as clearly shown in Fig. 9, has its rear end provided with an annular groove 62. A two part T-coupling 63 is carried by the rear end of each vertically swinging securing arm, and is provided with an inwardly extending annular flange 64, fitting within the annular groove 62. The two parts of this T-coupling are secured together by means of bolts 65, as shown. Each T-coupling 63 is provided with a transverse opening 66, receiving the end portions of the transverse driving shaft 57 and holding the gear casing 58 against perceptible longitudinal movement. The forward end of each vertically securing arm 61 extends into an opening 67, formed in a sleeve 68 of a head 69, and is held therein by a transverse pin or bolt 70, as is best shown in Fig. 10. The head 69 is provided adjacent the forward end of the vertically swinging securing arm 61 with a horizontal opening 71, receiving a horizontal pivot pin 72, as shown. This pivot pin passes through spaced vertical ears or knuckles 73 included in a bracket 74, rigidly secured to the transverse bar or strip 54, as shown. As more clearly shown in Fig. 7, the transverse strip or bar 54 is provided near each end thereof with a horizontal transverse opening 75, receiving a bolt 76, provided at its forward end with a forked head or end 77 and having its rear end screw-threaded to receive a nut 78. Arranged below the strip or bar 54 is a reinforcing plate 79, serving to strengthen the bar 54 and has a washer for the bolts which secure the brackets 74 upon the transverse strip or bar 54. The forked end 77 receives the apertured head 80 of a vertically swinging bolt 81 pivoted therein by a transverse pin or bolt 82. This vertically swinging bolt passes through, as clearly shown in Fig. 7, a suitably large aperture formed through the forward end of the head 69, as shown. Surrounding the vertically swinging bolt 81 above and below the head 69 are suitably stiff compressible and expansible coil springs 82' and 83, the inner ends of which engage said head. The outer or lower end of the spring 82' engages the head 80 while the outer or upper end of the spring 83 engages a nut 85 carried by the vertically swinging bolt 81. From the foregoing description it is obvious that the securing arms 61 are capable of being swung up and down, in opposition to the coil springs 82' and 83, which yieldingly oppose the movement thereof returning them to the normal position.

As more clearly shown in Fig. 8, a driving spur wheel 86 is rigidly secured to each end of the transverse driving shaft 57. The spur wheel is provided centrally thereof with a main opening 87 to receive the driving shaft and has a laterally extending opening 88, receiving a key 89 formed upon the outer end of the driving shaft. Any suitable means may be employed to prevent the improper longitudinal movement of the driving wheel upon the driving shaft. As more clearly shown in Figs. 8 and 9, each driving spur wheel is provided upon its periphery with a plurality of radially extending openings 90, which lead into an annular groove or recess 91, preferably formed upon the outer face of the wheel. Spurs 92 are provided, which are tapered toward their outer ends, as shown. These spurs carry inwardly extending apertured shanks 93, adapted to fit within the openings 90, the wheel 86 being provided with apertures 94 in registration with the apertures in the shanks 93. Holding pins 95 pass through the apertures 94 and the apertures in the shanks 90, to lock the spurs 92 to the wheel.

The numeral 96 designates brake mechanism, of any well known or preferred type, connected with and operated by inwardly extending cables 97, secured to the upstanding cranks 98, in turn rigidly mounted upon a transverse rock-shaft 99. A spring 100 is connected with one of these cranks to hold the rock-shaft from turning rearwardly and a brake pedal 101 is secured to the rock-shaft, to be depressed by the operator when he desires to apply the brakes.

In operation, the rotation of the drive shaft 14 is transmitted to bevel gear 15, bevel gear 56, and transverse driving shaft 57, which in turn rotates the driving spur gears. These driving spur gears rotating in engagement with the ice and snow propel the sled. It not infrequently happens that the sled is driven over a road bed having irregularities therein. My construction is particularly well adapted to take care of these irregularities, the driving spur gears being capable of automatically rising and falling, due to the manner in which they are pivotally and yieldingly connected with the frame. The steering of the sled is accomplished by turning the hand wheel 18 in the desired direction. It is thought that no further description of the invention is necessary for a clear understanding of the same.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. In a sled of the character described, a frame embodying a transverse bar, runners supporting the frame, brackets rigidly mounted upon the transverse bar with the bar having transverse openings beneath and adjacent the brackets, vertically swinging securing arms having their forward ends provided with approximately vertical apertures, means pivotally connecting the securing arms with the brackets at points disposed near and spaced from the forward ends of the securing arms, substantially horizontal bolts arranged within the transverse openings of said bar, vertically swinging bolts pivoted to the forward ends of the substantially horizontal bolts and arranged within the apertures of the securing arms, compressible coil springs surrounding the vertically swinging bolts and engaging the apertured ends of the securing arms to oppose their movement in opposite directions, a rotatable transverse shaft carried by the rear ends of the securing arms, a spur gear carried by the transverse shaft, and means to rotate the transverse shaft.

2. In a sled of the character described, a frame embodying a transverse bar, runners supporting the frame, brackets rigidly mounted upon the transverse bar with the bar having transverse openings beneath and adjacent the brackets, vertically swinging heads pivotally mounted upon the brackets with their rear ends provided with axially extending openings and their forward ends having approximately vertical apertures, substantially horizontal bolts arranged within the transverse openings of said bar and having forward forked heads, vertically swinging bolts pivotally mounted in the forward forked heads of the substantially horizontal bolts and extending into the apertures of the heads, compressible coil springs surrounding the vertically swinging bolts and engaging the apertured ends of the heads to oppose their movement in opposite directions, securing arms having their forward ends extending into the axial openings of the heads, a spur gear pivotally connected with the rear ends of the securing arms, and means to drive the spur gear.

3. In a sled, a frame, runners supporting the same, securing arms provided near their rear ends with annular grooves, a rotatable transverse shaft, two-part T-bearings receiving the transverse shaft and the rear ends of the securing arms and provided with interior annular flanges to enter the annular grooves, means to rotate the transverse shaft, spur gears carried by the transverse shaft, means to pivotally connect the securing arms with the frame to swing in a vertical plane with relation thereto, and yielding means to oppose the swinging movement of the securing arms.

4. In a sled, a frame, a runner arranged below the frame, an inverted approximately U-shaped apertured bracket arranged upon and rigidly secured to the upper side of the runner, a connecting bolt having its lower end engaging the runner and passing through the aperture of the bracket, a frame bracket attached to the frame and mounted to reciprocate upon the connecting bolt, and a suitably stiff coil spring surrounding the bolt between the frame and runner brackets.

5. In a sled, a frame, a runner arranged below the frame, an inverted approximately U-shaped bracket arranged upon and rigidly secured to the upper side of the runner, a substantially vertical connecting bolt having its lower end engaging the runner and passing through the aperture of the bracket, an apertured securing plate receiving the connecting bolt and arranged within the bracket and attached to the runner, an apertured bracket secured to the frame and mounted to reciprocate upon the connecting bolt, and a coil spring surrounding the connecting bolt between the brackets.

6. In a sled, a frame, a runner arranged below the frame, an approximately U-shaped bracket rigidly secured to the runner and provided with an aperture, a connecting bolt passing through the aperture of the bracket, an apertured securing plate to receive the bolt and attached to the runner, a bracket secured to the frame and loosely mounted upon the bolt, an apertured crank receiving the bolt and rigidly attached to the approximately U-shaped bracket, a spring surrounding the bolt between the crank and the frame bracket, and means to swing the crank.

7. A spur wheel for a power driven sled provided upon its periphery with radially extending openings and upon one face with an annular groove communicating with the radially extending openings, and spurs to be mounted upon the periphery of the wheel and carrying shanks adapted to be inserted through the radially extending opening and project into the annular groove.

8. A spur wheel for a power driven sled provided upon its periphery with radially extending openings and upon one face with an annular groove communicating with the inner ends of the openings and transverse apertures leading into the openings, and spurs having apertured shanks to be passed through the radially extending openings and project into the annular groove with their apertures in registration with the transverse apertures, and pins passed through the registering apertures to retain the shanks against displacement.

In testimony whereof I affix my signature in presence of two witnesses.

DANIEL PINKEL.

Witnesses:
   ALFORD C. FILLMORE,
   DAVID CARL.

Copies of this patent may be obtained for five cents each, by addressing the "Commissioner of Patents, Washington, D. C."